United States Patent
Eckhardt

(10) Patent No.: US 9,840,046 B2
(45) Date of Patent: Dec. 12, 2017

(54) APPARATUS FOR THE INTRODUCTION OF AIR AND/OR SEALANT INTO A TIRE

(75) Inventor: Arnold Eckhardt, Ranstadt (DE)

(73) Assignee: SUMITOMO RUBBER INDUSTRIES, LTD., Kobe-Shi, Hyogo-Ken (JP)

( * ) Notice: Subject to any disclaimer, the term of this patent is extended or adjusted under 35 U.S.C. 154(b) by 843 days.

(21) Appl. No.: 13/582,540

(22) PCT Filed: Mar. 2, 2011

(86) PCT No.: PCT/EP2011/001034
§ 371 (c)(1),
(2), (4) Date: Sep. 27, 2012

(87) PCT Pub. No.: WO2011/107272
PCT Pub. Date: Sep. 9, 2011

(65) Prior Publication Data
US 2013/0048146 A1 Feb. 28, 2013

(30) Foreign Application Priority Data
Mar. 5, 2010 (DE) .................. 10 2010 010 361

(51) Int. Cl.
B65B 1/04 (2006.01)
B29C 73/16 (2006.01)
B29L 30/00 (2006.01)

(52) U.S. Cl.
CPC ......... B29C 73/166 (2013.01); *B29L 2030/00* (2013.01)

(58) Field of Classification Search
USPC ... 141/38, 67, 100, 105, 114, 231, 313, 329, 141/330; 152/502, 415; 81/15.6
See application file for complete search history.

(56) References Cited

U.S. PATENT DOCUMENTS 4,765,367 A 8/1988 Scott
5,472,023 A * 12/1995 Fogal et al. .................. 141/9
(Continued)

FOREIGN PATENT DOCUMENTS

CN 1960850 A 5/2007
CN 101032952 A 9/2007
(Continued)

OTHER PUBLICATIONS

International Search Report for International Application No. PCT/EP2012/053328, dated Jun. 4, 2012.
(Continued)

*Primary Examiner* — Jason K Niesz
(74) *Attorney, Agent, or Firm* — Birch, Stewart, Kolasch & Birch, LLP

(57) ABSTRACT

An apparatus for the introduction of air and/or sealant into a tire includes a container for the sealant which has an inlet and an outlet, wherein the outlet end can be connected to the inlet end of a hose whose outlet end can be connected to the tire to be filled and includes a pressure generation means which can be selectively connected to the inlet of the container or to the inlet end of a hose whose outlet end can be connected to the tire to be filled. The same hose is provided for the connection between the pressure generation means and the tire to be filled, on the one hand, and between the outlet of the container and the tire to be filled, on the other hand, with respective couplings being provided at the pressure generation means, at the inlet of the container and at the outlet of the container as well as at the inlet end of the hose which selectively enable the inlet end of the hose to be connected directly to the pressure generation means or the inlet of the container to be connected to the pressure generation means and the inlet end of the hose to be connected to the outlet of the container.

18 Claims, 7 Drawing Sheets

(56) References Cited

U.S. PATENT DOCUMENTS

| | | | |
|---|---|---|---|
| 5,906,227 A * | 5/1999 | Sowry | 141/65 |
| 5,947,172 A | 9/1999 | Glotin | |
| 7,891,385 B2 | 2/2011 | Yanagi et al. | |
| 7,981,940 B2 * | 7/2011 | Iwasaki et al. | 521/41 |
| 2009/0301602 A1 | 12/2009 | Lolli et al. | |
| 2010/0108186 A1 * | 5/2010 | Yoshida et al. | 141/38 |
| 2011/0192492 A1 * | 8/2011 | Kanenari et al. | 141/38 |
| 2012/0037267 A1 | 2/2012 | Senno et al. | |

FOREIGN PATENT DOCUMENTS

| | | |
|---|---|---|
| CN | 101408155 A | 4/2009 |
| DE | 69807140 T2 | 4/2003 |
| DE | 10 2004 060 662 A1 | 7/2006 |
| EP | 1439053 A1 | 7/2004 |
| EP | 2163374 A1 | 3/2010 |
| JP | 2010-23244 A | 2/2010 |
| WO | WO 2008/035163 A2 | 3/2008 |
| WO | WO 2010/047231 A1 | 4/2010 |
| WO | WO 2010/123113 A1 | 10/2010 |

OTHER PUBLICATIONS

International Search Report issued in PCT/EP2011/001034 dated Jul. 22, 2011.
Chinese Search Report dated May 15, 2014 for Application No. 201180012075.6.

* cited by examiner

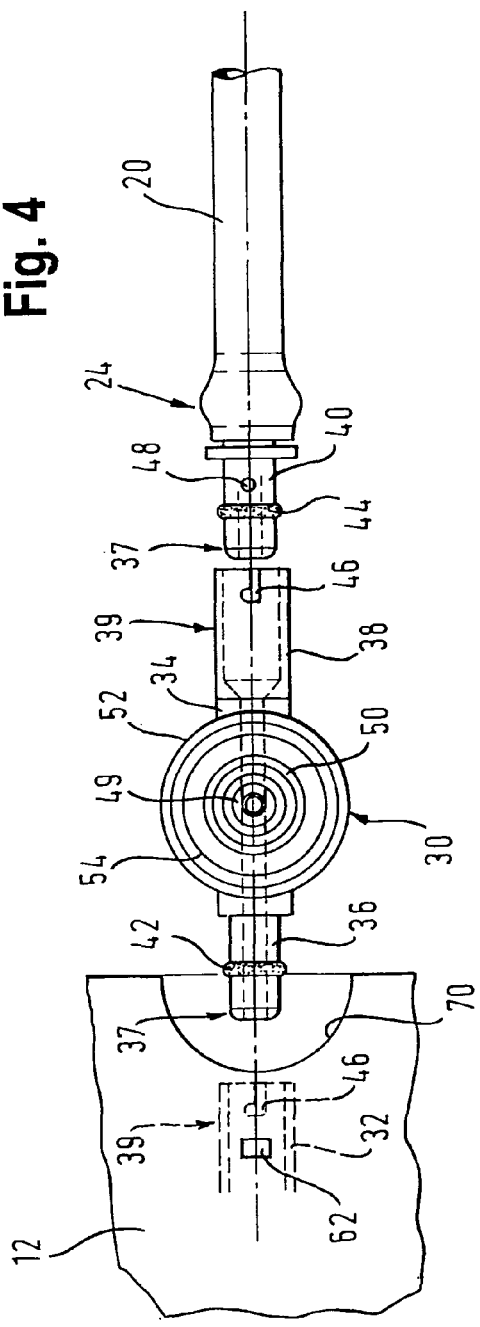
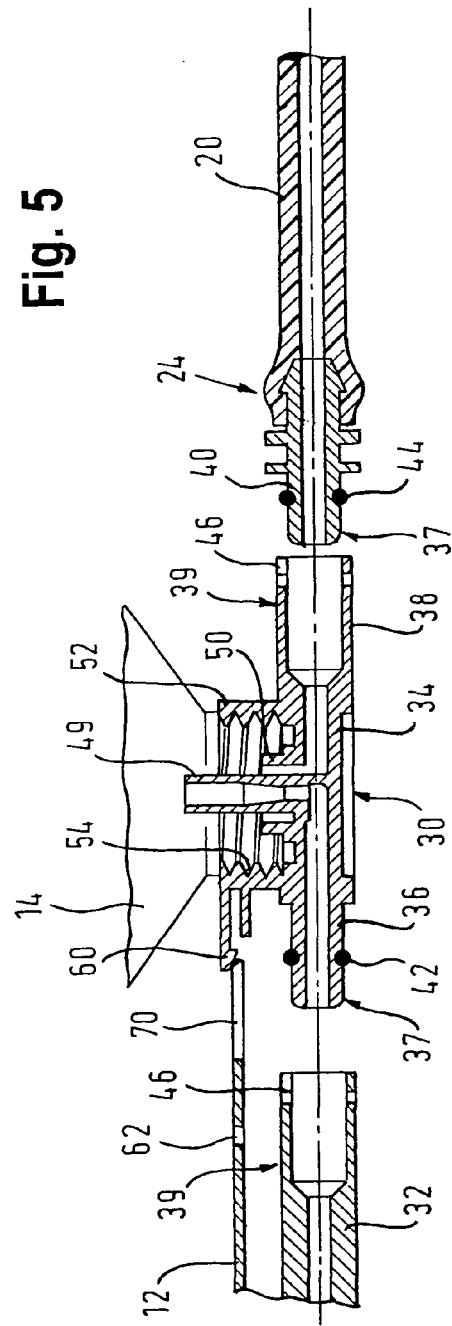

APPARATUS FOR THE INTRODUCTION OF AIR AND/OR SEALANT INTO A TIRE

The present invention relates to an apparatus for the introduction of air and/or sealant into a tire, in particular into a motor vehicle tire, having a container for the sealant which has an inlet and an outlet, wherein the outlet can be connected to the inlet end of a hose whose outlet end can be connected to the tire to be filled, and having a pressure generation means, in particular an electric pump or a compressor, which can be selectively connected to the inlet of the container or to the inlet end of a hose whose outlet end can be connected to the tire to be filled.

Such an apparatus can be carried along on a motor vehicle as a so-called puncture kit as a replacement for a spare wheel. Puncture kits can be used either only to inflate a tire or to seal and subsequently inflate a tire. The selective connection of the pressure generation means to the inlet of the container or to the inlet end of the hose can in this respect e.g. take place by means of a switch valve. Depending on whether a tire should only be inflated or should be both sealed and inflated, either the hose connected to the container or the hose connected to the pressure generation means is connected to the valve of the tire by a user. There is a problem in this respect in that the user must, on the one hand, set the switch valve to the correct position and must simultaneously connect the correct hose, that is either the air conveying hose or the sealant hose, to the tire. This is felt to be annoying. The provision of a switch valve is furthermore costly and requires additional construction space.

US-A-4 765 367 discloses a tire repair kit comprising a hose which may be connected selectively to a compressor or to an aerosol-type sealant container. A switch valve is used for changing between the two coupling modes.

There is a need to improve the handling of apparatus of the named kind and to simplify their structure.

The object is satisfied by an apparatus having the features of claim 1.

In accordance with the invention, the same hose is provided for the connection between the pressure generation means and the tire to be filled, on the one hand, and between the outlet of the container and the tire to be filled, on the other hand, with respective couplings being provided at the pressure generation means, at the inlet of the container and at the outlet of the container as well as at the inlet end of the hose which selectively enable the inlet end of the hose to be connected directly to the pressure generation means or the inlet of the container to the pressure generation means and the inlet end of the hose to the outlet of the container.

Due to the possibility of alternately coupling the pressure generation means, the container and the hose to one another and of decoupling them from one another, two different connection configurations of the apparatus are provided. Depending on the connection configuration, either a direct air throughflow takes place from the pressure generation means into the hose —without diversion through the container —or an air supply into the container takes place which has the consequence of a dispensing of sealant from the container into the hose. With a direct air throughflow, compressed air is discharged from the outlet end of the hose without sealant so that the apparatus can be used in the corresponding connection configuration for the pure inflation of a tire which is intact per se. With a diversion of the airflow delivered from the pressure generation means through the container, sealant is urged out of the container into the hose so that the apparatus can be used in this connection configuration for the sealing and subsequent inflation of a defective tire.

The operability of the apparatus is facilitated by the couplings since a user determines the desired operating mode —"only inflation" or "sealing and inflation"—by intuitive coupling together of the corresponding apparatus components. The user in particular neither has to take care of the actuation of a switch valve nor the correct selection between two hoses. Since one and the same hose is used for both operating modes and furthermore no switch valve is required, a saving of material, weight and manufacturing costs results and thus also a reduction in environmental impact. The apparatus can in particular also be designed in a more space saving manner, which is of particular importance with respect to the accommodation in a motor vehicle. It is also advantageous that due to the coupling ability of the individual apparatus components a replacement due to use can be restricted to the parts which are not reusable —that is e.g. to the container. After the end of the shelf life of the sealant, equally only the container can be replaced without superfluously also changing the hose.

Identical couplings are preferably provided for the connection of the pressure generation means to the inlet of the container, on the one hand, and for the connection of the outlet of the container to the inlet end of the hose, on the other hand. It is thus ensured that both the container and the hose can be coupled to the pressure generation means. The connection of the pressure generation means is therefore configured as a multipurpose connection due to the identical couplings.

The couplings are preferably made as plug-in connection couplings. This makes a particularly simple operability possible. A change between the two connection variants can in particular take place fast, which is particularly of importance in the event of a puncture. The couplings can, however, generally also be made as screw connections or as clamping connections.

In accordance with an embodiment, respective connection stubs of the pressure generation means, of the inlet of the container and of the outlet of the container as well as at the inlet end of the hose are made as plugs or sockets for a plug-in connection. A particularly simple construction is possible in this manner.

A coupling plug can in particular be provided at the inlet end of the hose which can selectively be plugged into a matching coupling socket at the pressure generation means or into a matching coupling socket at the outlet of the container. In this embodiment, a further coupling plug is expediently provided at the inlet of the container and can likewise be plugged into the coupling socket of the pressure generation means. It is generally a question of the respective application as to whether a plug is to be plugged into a socket or whether a socket is to be pushed onto a plug for the coupling.

O-rings for the sealing of the plug-in connections can be provided at the couplings. In this manner, air at a relatively high pressure can also be reliably directed from the pressure generation means to the container and/or to the hose.

Furthermore, locking devices can be provided by which the couplings can be latched in the coupled state. The locking devices can either be provided directly at the respective coupling components or at a housing of the corresponding apparatus components. A bayonet closure can, for example, be provided for the latching and unlatching of the respective coupling elements. An inadvertent separation of the mutually coupled apparatus components is avoided by the locking devices.

A safety valve or a pierceable membrane can be provided at the outlet of the container to close the outlet when the hose is not connected. It can thereby be prevented that sealant is discharged from the outlet in an unwanted manner if e.g. the switch for the activation of the pressure generation means is actuated by accident although no hose is connected to the outlet of the container. The safety valve can be designed so that it is opened by coupling of the hose to the outlet of the container in order thus to enable a dispensing of sealant via the hose into the tire to be sealed. The coupling can be designed in a special manner at the inlet end of the hose for this purpose. A coupling plug can in particular have an opening mandrel at the inlet end of the hose which presses a closure element of the safety valve into an open position on the coupling of the hose to the container. An opening mandrel at the inlet end of the hose can also serve to pierce a membrane which seals the outlet of the container in a delivery state of the apparatus.

In accordance with an embodiment of the invention, a removal unit is provided which is preferably releasably connected to the container, which is in particular able to be screwed onto the container and which has a respective support stub made as a coupling for the inlet and for the outlet. The removal unit can therefore have a connection stub for the supply of compressed air as well as a further connection stub for the removal of the sealant from the container, with the couplings being provided directly at the connection stub. An emptied container can be replaced in a simple and fast manner in that, for example, the emptied container is unscrewed from the removal unit and a filled container is screwed on.

In accordance with a further embodiment, the connection stub for the outlet of the container is offset by 180° to the connection stub for the inlet of the container at a housing of the removal unit. This has the advantage that the container with the removal unit can be coupled in a simple manner between the pressure generation means and the hose.

The removal unit is preferably arranged at the lower end of the container in the position of use of the apparatus. An emptying of the container which is as complete as possible is thereby facilitated. The container can be arranged on its side in the position of use of the apparatus. In order also to ensure a good emptying ability with an arrangement of the container on its side, the outlet can be located beneath the container base in the position of use. The container is, however, preferably arranged upside down in the removal position.

The coupling at the inlet end of the hose can be made for the connection to a pressure store or to a pressure regulation system, whereby the flexibility of the system can be further increased.

In accordance with a further embodiment, a housing is provided for the reception of at least some of the apparatus components. The housing can, for example, be accommodated at an easily accessible location in the trunk of a motor vehicle. The housing can generally also be arranged on its side in the position of use of the apparatus.

The housing can furthermore form a pedestal for the container. The housing is therefore simply placed on the floor for the use of the apparatus, with the container then being in the correct position of use. To ensure a reliable attachment for the container at such a pedestal, a cut-out can be provided at the one side of the housing into which a removal unit connected to the container can be plugged.

Further embodiments of the invention can be seen from the dependent claims, from the description and from the enclosed drawings.

The invention will be described in the following with reference to the drawings and to an embodiment.

FIG. 4 shows an enlarged part view of the apparatus of FIG. 1 from above;

FIG. 5 shows a lateral sectional view of the arrangement of FIG. 4;

Figure 1:
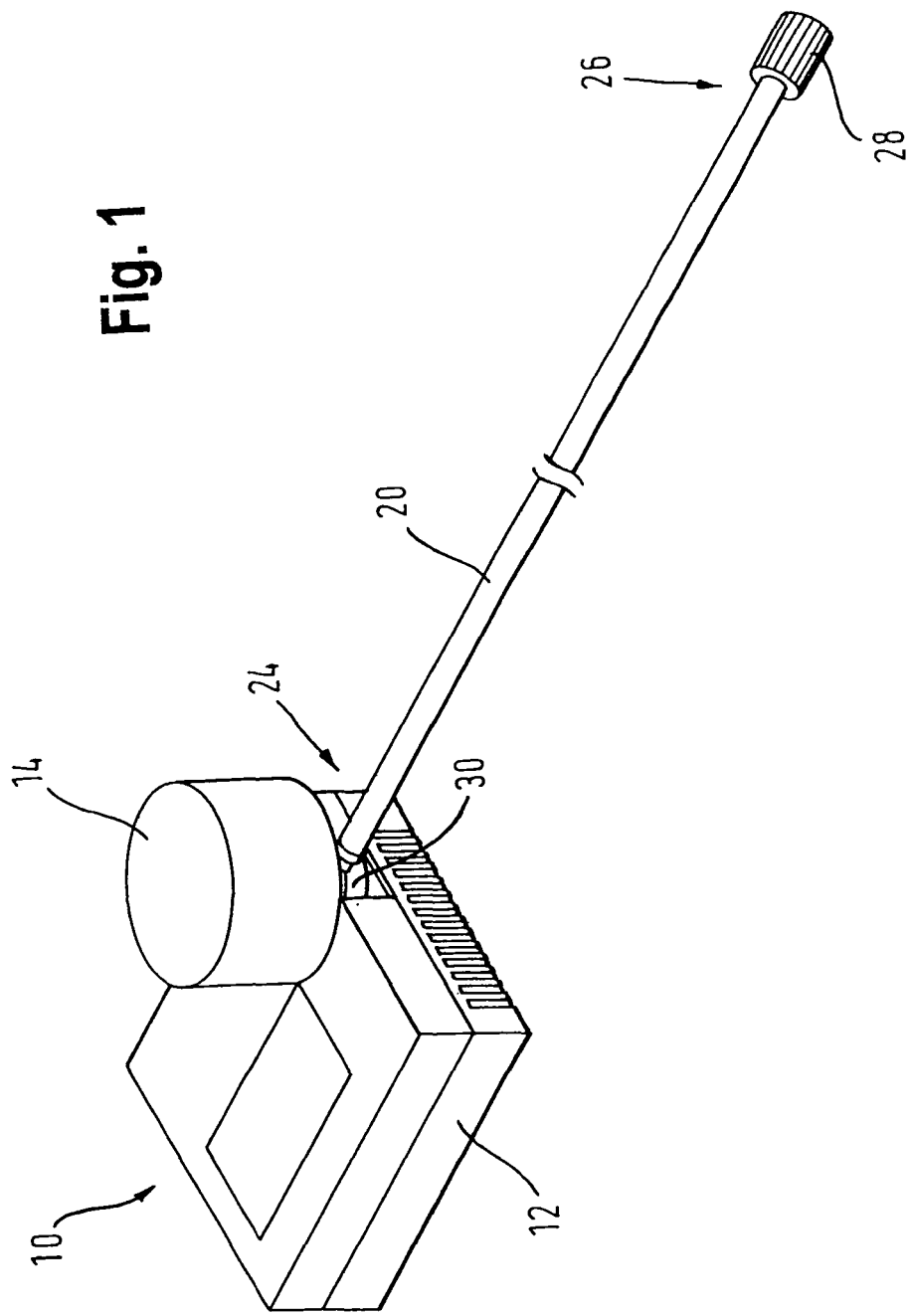
FIG. 1 shows an apparatus in accordance with the invention for the introduction of air and/or sealant into a tire in a first connection configuration.

FIG. 1 shows an apparatus 10 in accordance with the invention which is arranged in the position of use and which includes a housing 12, which has a compressor unit, not recognizable here, a container 14 with sealant and a hose 20. The compressor unit can include a compressor for the pressurizing of environmental air and an electric motor as a drive for the compressor which are likewise not recognizable in the drawings. The compressor unit is furthermore equipped with a manometer recognizable in FIGS. 2 and 3 for the display of the air pressure generated by the compressor. The compressor unit can be supplied with electric energy, for example, from a cigar lighter of a motor vehicle, by means of an electrical connection cable, not shown.

The hose 2 has an inlet end 24 and an outlet end 26, with the outlet end 26 having a corresponding connection piece 28 for the connection of the hose 20 to a tire valve, for example a so-called VG8 screw connection.

Figure 2:
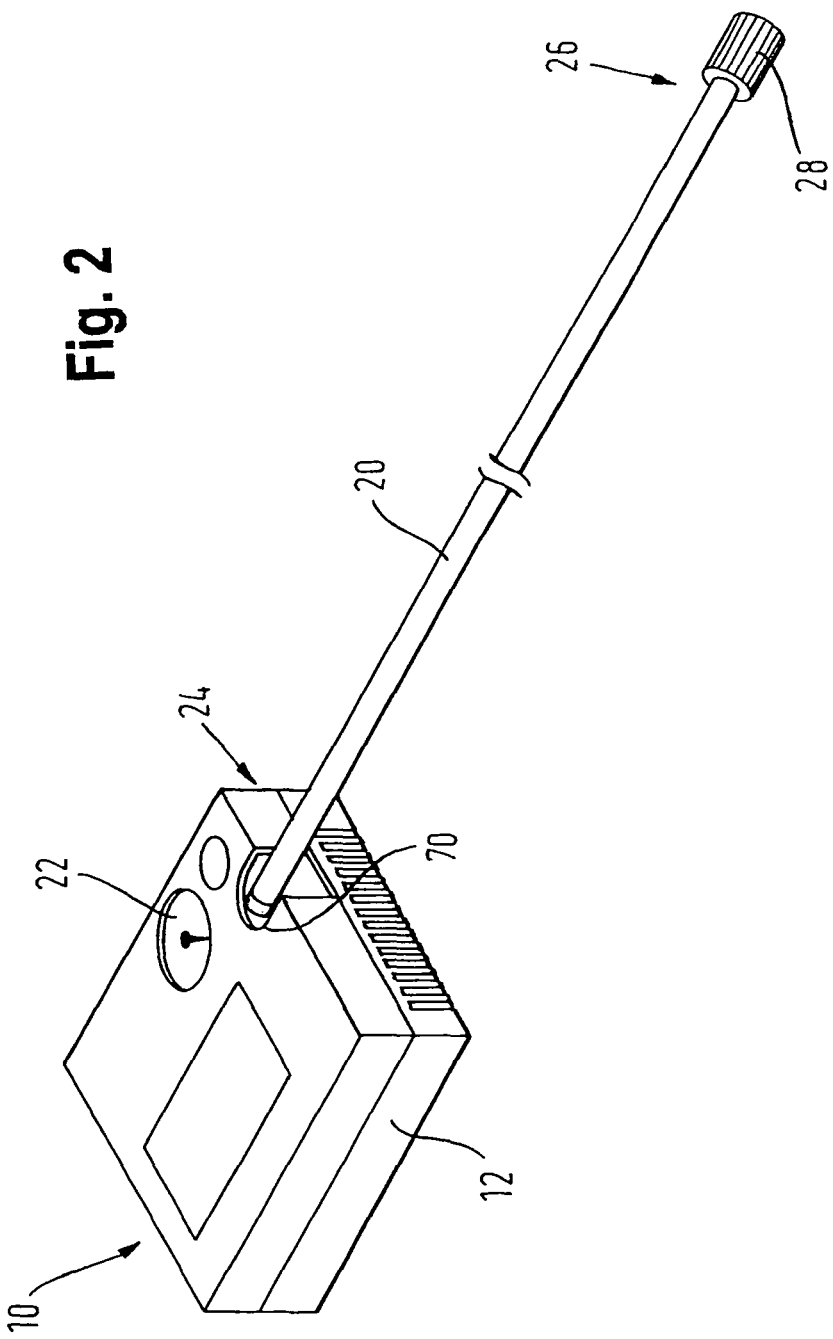
FIG. 2 shows the apparatus in accordance with FIG. 1 in a second connection configuration.

The container 14 has an inlet as well as an outlet. In the first connection configuration shown in FIG. 1, the inlet of the container 14 is connected to the compressor and the outlet of the container 14 is connected to the hose 20, as will be explained in even more detail in the following. On an activation of the compressor, e.g. by actuation of a switch, sealant can thus be introduced from the container 14 into a tire to be sealed. After emptying the container 14, the tire can be inflated directly in this manner. FIG. 2 shows the apparatus 10 in a second connection configuration; In this connection configuration, the hose 20 is directly connected to the compressor, while the container 14 is e.g. put to one side. Compressed air can thus be introduced into a tire to be filled which is intact per se without adding sealant or only the filling level of the tire can be checked using the manometer 22.

Figure 3:
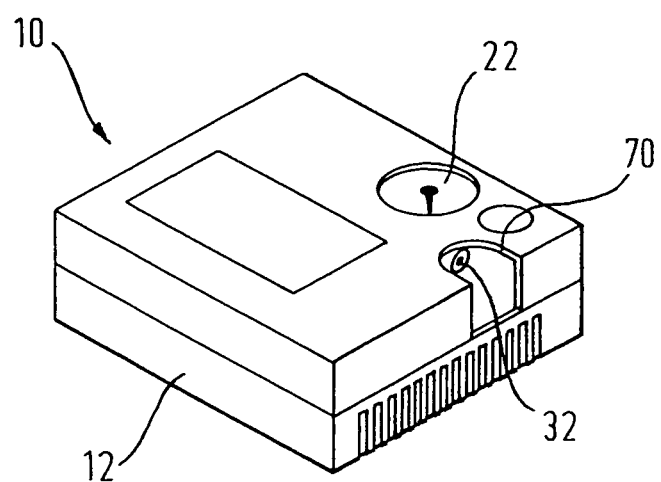
FIG. 3 shows a housing having pressure generation means of the apparatus of FIG. 1.
Figure 6:
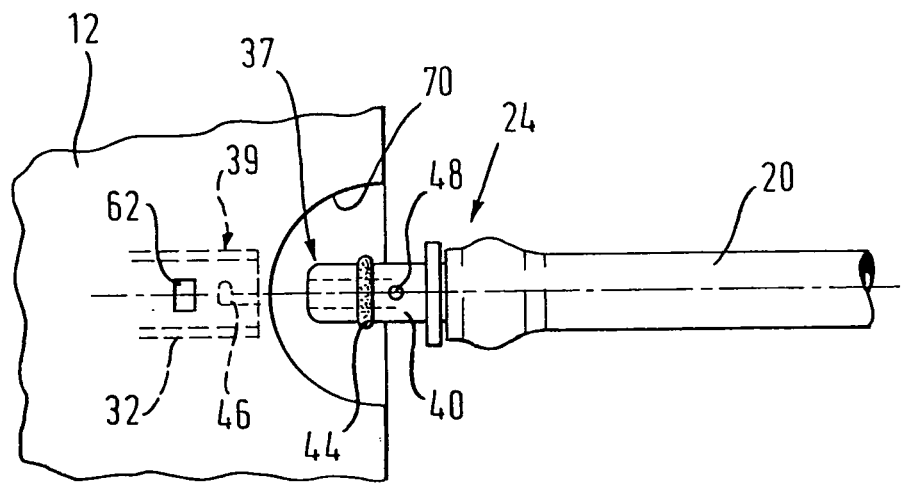
FIG. 6 shows an enlarged part view of the apparatus of FIG. 2 from above.
Figure 7:
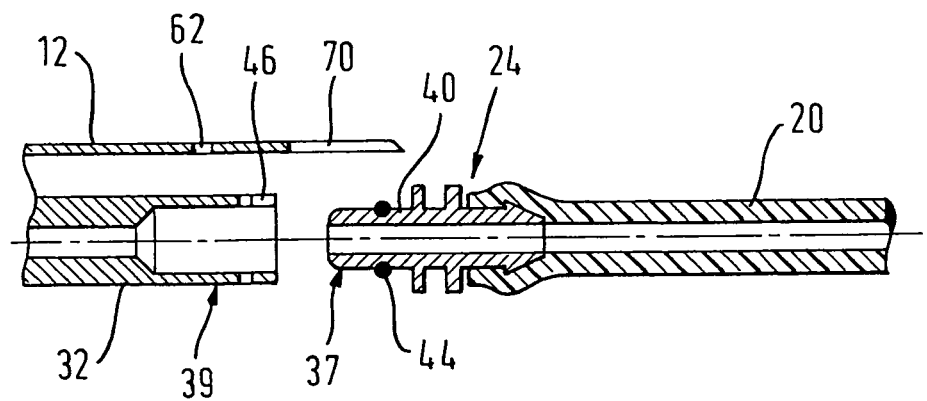
FIG. 7 shows a lateral sectional view of the arrangement of FIG. 6.

The housing 12 with the compressor unit is shown without a container 14 and without a hose 20 in FIG. 3. A removal of the container 14 and of the hose 20 can take place, for example, after an introduction of sealant into a tire has taken place or at the end of the shelf life of the sealant in the container 14 to provide a new container and, where necessary, a new hose.

To alternate between the first and second connection configurations, the compressor, the container 14 and the hose 20 can alternately be coupled to one another and decoupled from one another as will be explained more precisely in the following with reference to FIGS. 4 to 7.

The inlet and the outlet of the container 14, which can both be simply realized by the container neck, both open into a removal unit 30. The removal unit 30 is screwed onto the end of the container 14 which is downwardly located in the position of use and is arranged upside down to facilitate a complete emptying of the container 14 on removal of sealant. The removal unit 30 includes a housing 34 having an inlet connection stub 36 and an outlet connection stub 38 which are arranged at the housing 34 offset by 180° with respect to one another. The inlet connection stub 36 is made as a coupling plug 37 of a plug-in connection and the outlet connection stub 38 is made as a coupling socket 39 of a plug-in connection. The compressor furthermore has a compressor connection stub 32 which is likewise made as a coupling socket 39 of a plug-in connection. Furthermore, a hose connection stub 40 made as a coupling plug 37 is attached to the inlet end 24 of the hose 20.

The inlet connection stub 36 of the removal unit 30 can be plugged into the compressor connection stub 32, with a first O-ring 42 provided at the inlet connection stub 36 providing an ideal sealing of the connection. The hose connection stub 40 can equally be plugged into the outlet connection stub 38 of the removal unit 30, with a second O-ring 44 provided at the hose connection stub 40 providing an ideal sealing of the connection. In a state of the apparatus 10 ready for operation in accordance with the first connection configuration, the inlet connection stub 36 of the removal unit 30 is plugged into the compressor connection stub 32 and the hose connection stub 40 is plugged into the outlet connection stub 38 of the removal unit 30. In this state, the plug connections can each be secured against accidental decoupling by mutual rotation of the coupling plug 37 and of the coupling socket 39. For this purpose, angled grooves 46 are provided at the compressor connection stub 32 and at the outlet connection stub 38 of the removal unit 30 and a corresponding locking pin 48 of the hose connection stub 40 can engage into said grooves.

Furthermore, a preferably resilient latching hook 60 projects from the housing 34 of the removal unit 30 and can latch into a recess 62 provided at the housing 12 of the apparatus 10 in order thus to fix the removal unit 30 to the housing 12. A cut-out 70 provided at a side of the housing 12 allows an access to the compressor connection stub 32 and furthermore serves to receive the removal unit 30 at least in part in the housing 12 in order thus further to stabilize the connection between the container 14 and the housing 12 serving as a pedestal. When the removal unit 30 is attached to the housing 12, the inlet connection stub 36 is therefore plugged into the compressor connection stub 32, the latching hook 60 is latched into the recess 62 and the border of the cut-out 70 is in engagement with a section of the housing 34 of the removal unit 30 so that overall a particularly reliable attachment of the removal unit 30 and thus of the container 14 results at the housing 12.

The removal unit 30 has a container inlet connection stub 49 and also a container outlet connection stub 50 beside the inlet connection stub 36 and the outlet connection stub 38. The container inlet connection stub 49 and the container outlet connection stub 50 are arranged offset by 90° with respect to the inlet connection stub 36 and to the outlet connection stub 38 at the housing 34 of the removal unit 30 and extend nesting coaxially into one another. A jacket 52 likewise coaxial to the container inlet stub 49 and having an internal thread 54 serves to screw the housing 34 onto a corresponding counter-thread of the container 14. When the housing 34 is screwed onto the container 14, both the container inlet connection stub 49 and the container outlet connection stub 50 are connected to the interior of the container 14. In this respect, the container 14 can have an inlet and an outlet separate therefrom, with the inlet being in communication with the container inlet connection stub 49 and the outlet being in communication with the container outlet connection stub 50. Alternatively, the container 14 can also have an opening into which both the container inlet connection stub 49 and the container outlet connection stub 50 open when the housing 34 is screwed on and which thus simultaneously serves as an inlet and an outlet. With such a configuration, the inlet of the container 14 is therefore identical to the outlet of the container 14.

Since the two coupling plugs 37 of the apparatus 10 are of identical design and since furthermore the two coupling sockets 39 are also of identical design, the hose connection stub 40 cannot only be plugged into the output connection stub 38 of the removal unit 30, but also, if desired, into the compressor connection stub 32. The hose 20 can in this manner therefore be directly coupled to the compressor in order thus to introduce the compressed air generated by the compressor into the tire without the addition of sealant. This corresponds to the second connection configuration shown in FIGS. 6 and 7.

After activation of the electric motor, the compressor generates an airflow at its outlet which is directed to the hose 20 either directly or while including the container 14 depending on the connection configuration. If the airflow first moves into the container 14, the sealant is first blown by the thereby arising pressure increase in the container 14 via the outlet connection stub 38 and the hose 20 into a leaking tire connected to the outlet end 26 of the hose 20 to seal this tire. Subsequently, the tire can be inflated with air in this manner to set the prescribed tire pressure. If, in contrast, the hose 20 is coupled directly to the compressor, a tire connected to the outlet end 26 of the hose 20 can thus be inflated with air without the supply of sealant.

Depending on the connection configuration, either a tire to be repaired can be filled with sealant and air or a functioning tire can be directly inflated with air from the compressor. The inflation of the intact tire or the sealing of the leaking tire in this respect takes place using one and the same hose 20 so that the user only has to couple the compressor, the container 14 to the removal unit 30, and the outlet end 26 of the hose 20 in the correct manner by means of the coupling plugs 37 and the coupling sockets 39 before putting the apparatus into operation. Since it is in this respect essentially a question of either coupling the hose 20 directly to the compressor or, otherwise of coupling the container 14 with the removal unit 30 therebetween, the risk of an incorrect use is relatively small. In the case of a replacement of the container 14, the removal apparatus 30 with the integrated connection stubs 36, 38 can generally be used again, which is in particular advantageous under environmental aspects.

Figure 8:
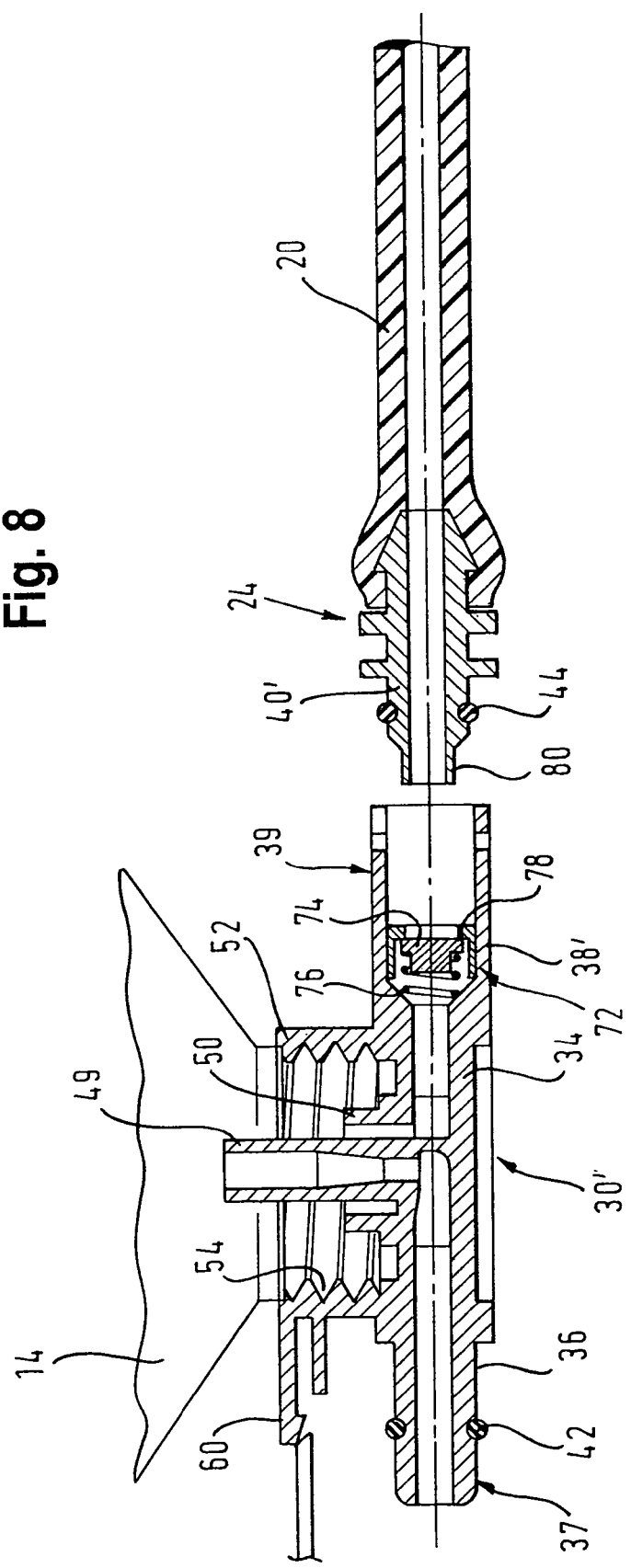
FIG. 8 shows a lateral part-sectional view of an apparatus in accordance with an alternative embodiment of the invention.

An alternative embodiment of the invention is shown in FIG. 8. The outlet connection stub 38' of the removal unit 30' is equipped with a safety valve 72 in this embodiment to avoid an unintentional escape of sealant from the outlet connection stub 38'. The safety valve 72 includes a sealing disk 74 which is preferably made from rubber and which is pressed toward a valve seat 78 by means of a spring 76 to effect a closure of the outlet connection stub 38'. The hose connection stub 40' has a tapered end section 80 which abuts the sealing disk 74 on the plugging of the hose connection stub 40' into the outlet connection stub 38' and presses it away from the valve seat 78 into an open position. With a safety valve 72 opened in this manner, sealant can enter into the hose 20 from the container 14 via openings at the hose connection stub 40' not recognizable in the drawing. If a user should switch on the compressor although no hose is coupled to the removal unit 30', the safety valve 72 prevents an unintentional escape of sealant by closure of the outlet connection stub 38'.

Figure 9:
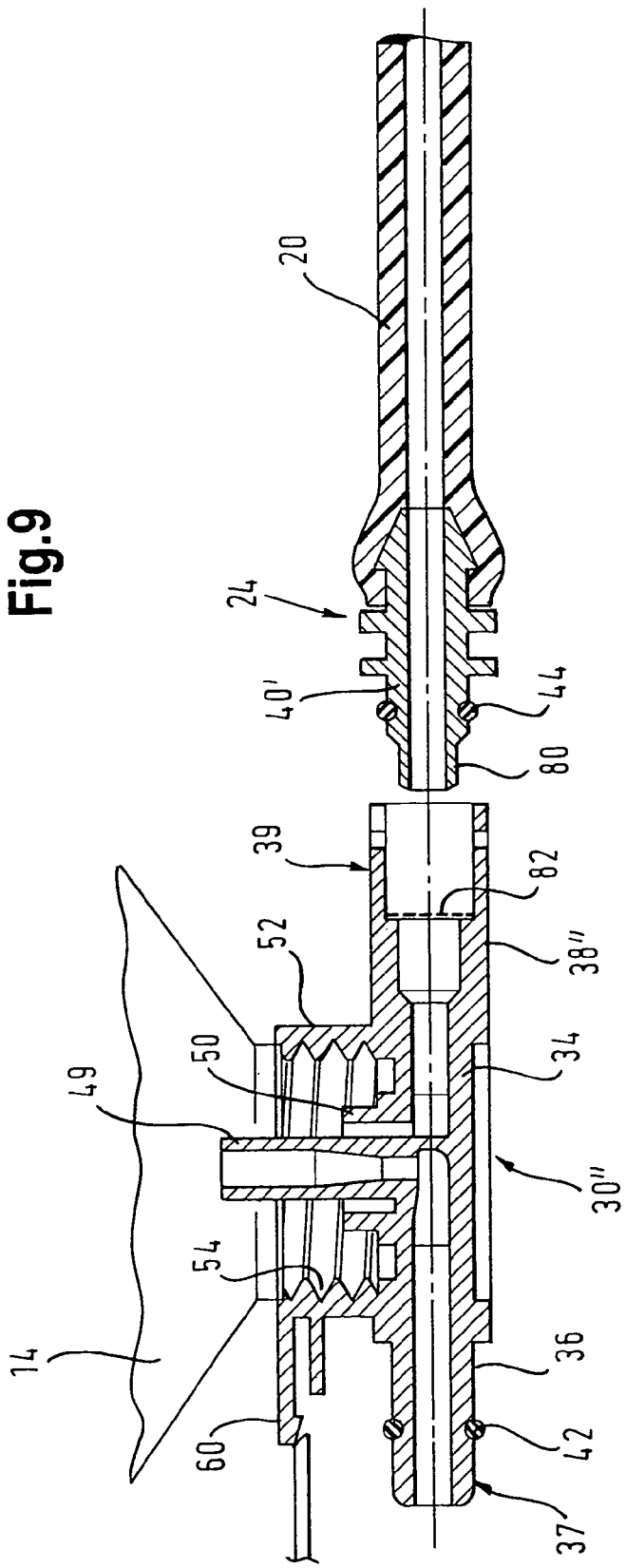
FIG. 9 shows a lateral part-sectional view of an apparatus in accordance with a further embodiment of the invention.

FIG. 9 shows a further embodiment of the invention. To avoid an unintended escape of sealant, the outlet connection stub 38" of the removal unit 30" in this embodiment is closed in the delivery state by a pierceable membrane 82. The membrane 82 can be a hot-sealing film arranged in the outlet connection stub 38". The hose connection stub 40' has a similar design to that described with reference to FIG. 8 and in particular likewise has a tapered end section 80. On the plugging of the hose connection stub 40' into the outlet connection stub 38", the tapered end section 80 acting as an opening mandrel pierces the membrane 82 and thus establishes flow communication between the container 14 and the hose 20.

REFERENCE NUMERAL LIST

10 apparatus
12 housing
14 container
20 hose
22 manometer
24 inlet end
26 outlet end
28 connection piece
30, 30', 30" removal unit
32 compressor connection stub
34 housing
36 inlet connection stub
37 coupling plug
38, 38', 38" outlet connection stub
39 coupling socket
40, 40' hose connection stub
42 first O-ring
44 second O-ring
46 groove
48 locking pin
49 container inlet connection stub
50 container outlet connection stub
52 jacket
54 internal thread
60 latching hook
62 recess
70 cut-out
72 safety valve
74 sealing disk
76 spring
78 valve seat
80 tapered end section
82 membrane The invention claim is:

1. An apparatus for the introduction of air and/or sealant into a tire, said apparatus comprising:
    a container for the sealant which has an inlet and an outlet, wherein the outlet can be connected to the inlet end of a hose having an outlet side that can be connected to the tire to be filled; and
    a pressure generation means which can be selectively connected to the inlet of the container or to the inlet end of a hose having an outlet end that can be connected to the tire to be filled,
    wherein couplings are provided at the pressure generation means, at the inlet of the container, at the outlet of the container, and at the inlet end of the hose, which couplings selectively (a) allow the inlet end of the hose to be connected directly to the pressure generation means or (b) allow the inlet of the container to be connected to the pressure generation means and simultaneously the inlet end of the hose to be connected to the outlet of the container
    wherein the hose can be connected between the pressure generation means and the tire to be filled, as well as between the outlet of the container and the tire to be filled, and
    wherein a safety valve or a pierceable membrane is provided at the outlet of the container to close the outlet when no hose is connected.

2. The apparatus according to claim 1, wherein said tire is a motor vehicle tire.

3. The apparatus according to claim 1, wherein the pressure generation means is either an electric pump or a compressor.

4. The apparatus according to claim 1, wherein the couplings that are provided for the connection of the pressure generation means to the inlet of the container and for the connection of the outlet of the container to the inlet end of the hose are identical.

5. The apparatus according to claim 1, wherein the couplings are plug-in connection couplings.

6. The apparatus according to claim 5, wherein the pressure generation means, the inlet and of the outlet of the container, and the inlet end of the hose have connection stubs that are plugs or sockets for a plug-in connection.

7. The apparatus according to claim 3, wherein a coupling plug is provided at the inlet end of the hose which can selectively be plugged into a matching coupling socket at the pressure generation means or into a matching coupling socket at the outlet of the container.

8. The apparatus according to claim 5, wherein O-rings are provided at the couplings to seal the plug-in connections.

9. The apparatus according to claim 1, wherein locking devices are provided so that the couplings can be latched in a coupled state.

10. The apparatus according to claim 1, wherein a removal unit is provided which has a connection stub for coupling for the inlet and the outlet of the container.

11. The apparatus according to claim 10, wherein the removal unit is releasably connected to the container.

12. The apparatus according to claim 10, wherein the removal unit can be screwed onto the container.

13. The apparatus according to claim 10, wherein the connection stub for the outlet of the container is arranged offset by 180° with respect to the connection stub for the inlet of the container at a housing of the removal unit.

14. The apparatus according to claim 10, wherein the removal unit is arranged at the lower end of the container in the position of use of the apparatus.

15. The apparatus according to claim 1, further comprising a pressure store or a pressure regulation system, wherein a coupling is formed at the inlet end of the hose for the connection to the pressure store or pressure regulation system.

16. The apparatus according to claim 1, wherein a housing is provided for the reception of at least some of the apparatus components.

17. The apparatus to claim 16, wherein the housing forms a pedestal for the container.

18. The apparatus to claim 16, wherein a cut-out is provided at a side of the housing into which a removal unit connected to the container can be plugged.

\* \* \* \* \*